Patented Jan. 25, 1949

2,459,952

UNITED STATES PATENT OFFICE 2,459,952

STABILIZED ALKALINE VEGETABLE PROTEIN SOLUTIONS

Alfred Frank Millidge, Coventry, and Claude Leonard Knight, Kenilworth, England, assignors to Courtaulds Limited, London, England, a British company No Drawing. Application January 17, 1947, Serial No. 722,760. In Great Britain February 25, 1946

2 Claims. (Cl. 106—154)

This invention relates to the production and use of alkaline vegetable protein solutions such as are used for example in spinning. The term "vegetable protein" as used herein means the protein which is present in seeds such as bean or pea meal, nut meal and the like.

The ordinary method of extracting vegetable protein from seeds consists in extracting the oil-free meal with dilute alkali solutions and subsequently filtering and centrifuging the extract. This method invariably yields a liquor which is cloudy, due to the presence of particles so finely dispersed that they are not removed by ordinary separation processes. Moreover, when the protein is precipitated by the addition of acid sufficient to lower the pH value of the liquor to the iso-electric point, the dispersed particles are co-precipitated with the protein. When it is desired to form spinning solutions from the thus-precipitated protein, the latter is dissolved in dilute alkali such as dilute caustic soda solution and it is well-known that the solutions obtained are cloudy and unstable; in particular the solutions suffer rapid changes in viscosity and darkening in colour and also tend to form a skin on the liquor-air interface.

According to the invention, we improve the stability of alkaline solutions of vegetable protein by incorporating in the solution, a compound giving rise to cyanide ions (—CN) in the solution.

The invention comprises an aqueous alkaline solution of vegetable protein which is suitable for extrusion in the manufacture of threads, and which contains as a stabilising agent a compound giving rise to cyanide ions (—CN) in the solution.

The invention also includes a method of stabilising an aqueous alkaline solution of vegetable protein which comprises incorporating in the solution a compound giving rise to cyanide ions (—CN) in the solution.

The invention also includes a process for the manufacture of vegetable protein threads which comprises the steps of forming an aqueous alkaline spinning solution of vegetable protein, stabilising the solution so obtained by incorporating in the solution a compound giving rise to cyanide ions (—CN) in the solution extruding the stabilised solution in thread form into a coagulating medium, and hardening, washing, drying and collecting the threads so produced.

The invention also includes manufactured threads of vegetable protein containing a trace of cyanide.

The proportion of the added compound giving rise to cyanide ions may be very small, for example 0.1 per cent or even less, based on the weight of the solution.

Preferred compounds, giving rise to cyanide ions are the cyanides of metals chosen from the group consisting of the alkali metals, the alkaline earth metals and ammonium, for example sodium cyanide, potassium cyanide, calcium cyanide, barium cyanide and ammonium cyanide; for economic reasons, sodium cyanide is preferred. The sodium cyanide may be prepared in the protein solution by adding hydrocyanic acid to a solution of the protein in aqueous caustic soda.

The metal cyanide may be added directly to the protein solution but is preferably incorporated in the form of an aqueous solution, for example a 10 per cent solution.

Vegetable portein spinning solutions usually contain from 15 to 25 per cent of protein dissolved in aqueous caustic soda solution. These solutions may be stabilised according to the invention by the incorporation of 0.1 per cent of a cyanide such as sodium cyanide, the cyanide being preferably added in the form a 10 per cent aqueous solution, by adding 1 part of the 10 per cent sodium cyanide solution to 100 parts of the spinning solution.

The invention is illustrated by the following example in which the parts and percentages are by weight:

Example

A 20 per cent aqueous solution of peanut protein was prepared by dissolving 1 part of protein extracted from oil-free peanut meal in 4 parts of a 1.0 per cent aqueous caustic soda solution. The solution was divided into two parts and 0.1 per cent of sodium cyanide, in the form of a 10 per cent aqueous solution, was added to one part. Both solutions were allowed to stand and were observed periodically. The control solution, containing no sodium cyanide, had darkened slightly and had become more viscous, and exhibited skin formation within 12 hours, and after three days, had completely gelled and was useless for spinning. On the other hand, the solution containing the sodium cyanide after seven days showed no darkening in colour or skin formation and was spun satisfactorily into threads by extrusion into an acid coagulating bath and hardening, washing, drying and collecting the threads in the usual way.

What we claim is:

1. An aqueous alkaline solution of vegetable protein which is suitable for extrusion in the manufacture of threads and which contains as a stabilising agent, a cyanide from the group consisting of the alkali metal cyanides, the alkaline earth metal cyanides and ammonium cyanide, said cyanide being present in an amount not exceeding about 0.1 per cent based on the weight of the solution.

2. An aqueous alkaline solution as claimed in claim 1 wherein the cyanide used is sodium cyanide.

ALFRED FRANK MILLIDGE.
CLAUDE LEONARD KNIGHT.

REFERENCES CITED

The following references are of record in the file of this patent:

UNITED STATES PATENTS

| Number | Name | Date |
|---|---|---|
| 2,394,309 | Kajita et al. | Feb. 5, 1946 |